July 24, 1956  M. COHEN  2,755,563
APPARATUS FOR REMOVING SYNTHETIC
CLEANING FLUID FROM FILTER MUCK
Filed Feb. 6, 1953  2 Sheets-Sheet 2

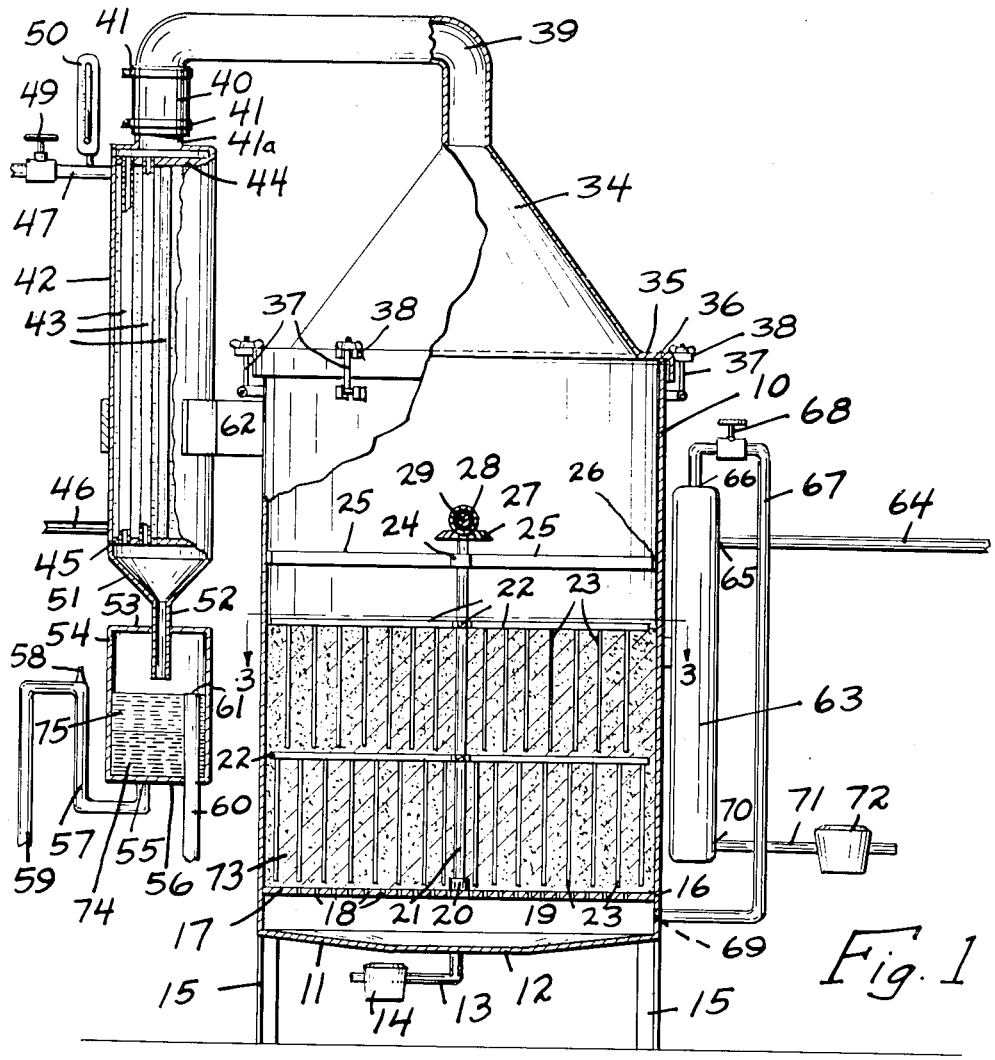

INVENTOR.
Meyer Cohen
BY
Sam J. Slotsky
ATTORNEY

United States Patent Office 2,755,563
Patented July 24, 1956

2,755,563

APPARATUS FOR REMOVING SYNTHETIC CLEANING FLUID FROM FILTER MUCK

Meyer Cohen, Sioux City, Iowa, assignor of thirty-six per cent to Marvin D. Cohen, Sioux City, Iowa Application February 6, 1953, Serial No. 335,558

The portion of the term of the patent subsequent to February 22, 1972 has been disclaimed 3 Claims. (Cl. 34—76)

My invention relates to an apparatus for removing synthetic cleaning fluids from filter muck.

An object of my invention is to provide an apparatus in which the cleaning fluid which is used for cleaning clothing in cleaning plants and the like, is reclaimed from the filter muck, which muck is in the form of a highly absorbent powder, which has absorbed the resultant oils, greases, along with the cleaning fluid which has been used.

A further object of my invention is to provide an apparatus for removing the cleaning fluid, and to extract the maximum amount thereof to thereby result in a considerable economy in that the expensive cleaning fluid is reclaimed for re-use.

A further object of my invention is to provide an apparatus in which the muck is periodically agitated to assist in the efficient operation of the process.

A further object of my invention is to provide a simple apparatus which will not get out of order, and which requires a minimum amount of mechanism or other parts.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a forward elevation of my device, with fragmentary sections being taken thereof.

Figure 2 is a plan view of Figure 1 with fragmentary sections thereof.

Figure 3:
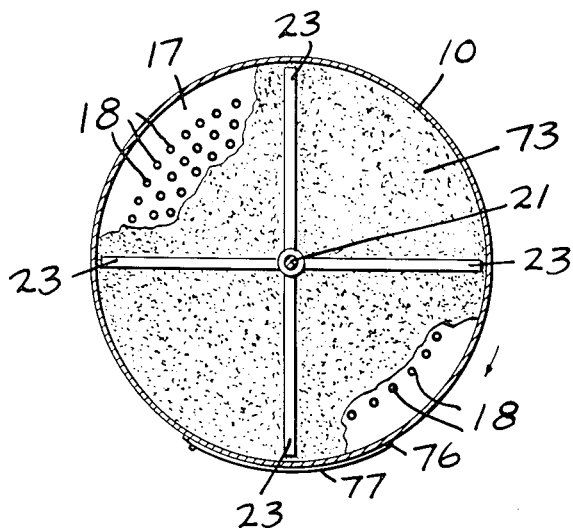
Figure 3 is a sectional view of Figure 1 taken generally along the line 3—3 of Figure 1.

My invention contemplates the provision of an apparatus by which cleaning fluid is reclaimed from the so-called muck which has resulted from the absorption by certain highly absorbent powders of grease, oils, and other products, resulting from cleaning processes.

My invention pertains particularly to cleaning fluid having a relatively high specific gravity and pertains more particularly to the cleaning fluid perchlorethylene.

I have used the character 10 to indicate a cylindrical container or vessel having the bottom wall 11, the bottom wall 11 including the depressed portion 12 which communicates with the pipe 13, which pipe communicates with the trap 14. Attached to the bottom wall 11 and supporting the vessel 10 are the legs 15.

Welded to the container 10 at 16 and completely about the periphery thereof is the circular plate 17, in which plate I provide a multiplicity of spaced openings 18, these openings being arranged substantially as shown in Figure 3 with the outer openings being spaced substantially inwardly from the cylindrical walls of the vessel 10.

An expansion chamber 19 is thereby provided by this structure, between the plate 17 and the bottom wall 11, wherein steam entering the chamber may become superheated due to expansion.

Attached to the plate 17 is a bearing member 20 in which is journaled a vertical shaft 21 to which shaft are attached the various bars 22, it being noted from Figure 3 particularly that the bars 23 are arranged at right angles to each other, and attached to the various bars 22 are the vertically positioned tines 23.

Figure 4:
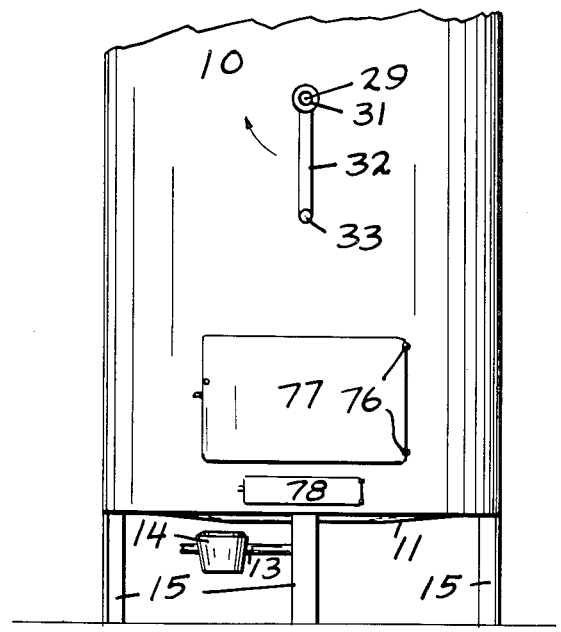
Figure 4 is a forward elevation of a portion of the device.

The shaft 21 is journaled within a further bearing 24 which is suitably secured by means of the transverse braces 25 which are attached at 26 to the wall of the container 10, and attached at the top of the shaft 21 is a bevel gear 27 which meshes with a smaller bevel gear 28, the bevel gear 28 being secured to a shaft 29 which is journaled at 30 within a suitable bearing attached to the wall of the member 10, the shaft 29 passing through the wall of the member 10, and being attached at 31 to the bar 32 (see Figure 4) which terminates in the handle portion 33.

The vessel 10 is open at its upper end, and secured thereto is a conical member 34 which includes the annular portion 35, resting upon the gasket 36, the member 34 being secured at the top of the member 10 by means of the spaced T-bolts 37 secured to the lugs 38.

Attached to the top of the member 34 and communicating therewith is a hollow pipe 39 to which is clamped the rubber connecting hose 40, which is clamped thereto by means of the clamps 41, the member 40 communicating with the short pipe section 41a, which in turn communicates with the cylindrical water condenser 42, the condenser 42 including several vertically positioned tubes 43, the tubes 43 communicating through the upper plate 44 and through the lower plate 45, the space between the tubes being filled with the circulating cooling water, the pipe 46 indicating the supply or inlet pipe for the cooling water, the upper pipe 47 being the exit pipe which is controlled by means of the valve 49. The character 50 indicates a thermometer for registering the temperature of the cooling water.

Communicating with the condenser 42 is a conical member 51 which is secured to the vertically positioned tube 52 which passes through the upper wall 53 of a cylindrical vessel 54. Communicating at 55 with the bottom wall 56 of the vessel 54 is the pipe or tube 57 which is bent upwardly and thence downwardly, to which tube 57 is attached a short pipe section 58, which is open at its upper end to provide an air opening, the pipe or tube 57 passing downwardly at 59 to any suitable vessel which is to receive the reclaimed fluid.

Also passing through the bottom wall 56 is a water exit pipe 60, having its upper open end 61 at the approximate position shown.

The condenser 42 can be secured by means of a bracket 62 or by any other means.

Also attached to the vessel 10 is a trap or water vapor separator member 63, this member being specifically provided to remove as much moisture as possible from the steam which is used in the process in order to provide a very dry steam. The abrupt change in directional flow of the steam through the separator 63 removes the free moisture from the steam. The steam pipe line is indicated by the character 64 which communicates with the separator 63 at 65, and communicating at 66 with the separator 63 is a further pipe 67 having the control valve 68, the pipe 67 communicating at 69 with the chamber 19. Attached at 70 to the separator 63 is the pipe 71 which communicates with a water trap 72 which is adapted to receive the moisture condensed from the steam in the member 63.

The filter muck from which the cleaning fluid is to be removed is placed in the vessel 10 after the conical member 34 is first removed by loosening the bolts 37, and after the upper clamp 41 has been loosened, this muck being generally indicated by the character 73, the muck being filled to the approximate level as shown in Figure 1. The member 34 is then replaced, and saturated steam under approximately 50 pounds pressure or any other desired pressure is allowed to enter the condenser 63 by means of the pipe 64. This steam will then be separated from its moisture content, which moisture will pass into the trap 72, and this very dry steam will then pass through the pipe 67 through the opening 69 into the chamber 19. Valve 68 in line 67 is used to reduce the pressure of the dry steam entering the expansion chamber 19. Expansion of the steam downstream of the valve 68 results in superheating which further insures passage of dry steam only into the muck. This steam will pass through the openings 18 and will force upwardly through the muck, the heating action of the steam as well as the pressure thereof carrying the volatilized cleaning fluid which is to be reclaimed, upwardly into the conical member 34 and thence into the pipe 39, and into the condenser 42, these products then passing downwardly through the various tubes 43 where they are condensed by means of the cooling water, the condensed steam which is now in the form of water gravitating through the tube 52, and with the cleaning fluid also gravitating through the same tube.

Since the cleaning fluid is heavier than water, it will sink to the bottom of the vessel 54, this cleaning fluid being indicated by the character 74. This fluid will then be partially siphoned and will partially fall by gravity through the pipe 59 into any suitable vessel, the air opening at 58 preventing a maximum siphoning action, thereby maintaining the levels of the cleaning fluid and the water approximately as shown.

The condensed water is indicated by the character 75 and will pass through the opening 61 downwardly through the pipe 60 and will be carried away. After the process has run for approximately 30 minutes, the handle 33 is used to rotate the bar 32 to thereby rotate the shaft 29 which in turn will cause rotation of the bars 22, which will cause the tines 23 to stir or agitate the muck so that the passage of the steam upwardly and through the same will be accomplished with greater efficiency, and this stirring action can be applied from time to time to thereby increase the speed of separation.

I have found through the actual operation of the device that the cleaning fluid to be reclaimed is completely removed from the absorbent powder with the resultant powder being completely dry after the process is completed, and I have found that the process and apparatus will deliver the reclaimed fluid at approximately only .03¢ per gallon, which in effect results in a considerable saving. I have also found that the cleaning fluid is free of impurities, and is ready for re-use, and by actual chemical tests, is delivered practically as pure as in its original state.

This process can also apply to the cleaning fluid known as trichlorethylene. The process will only function properly by the use of very dry steam preferably having less than five percent moisture content.

The use of steam in the manner stated, provides the results desired together with the other parts of the apparatus.

Attached to the container 10 by means of suitable hinges 76, is an arcuate door 77 which communicates with a suitable opening in the member 10, which can be used as a doorway for cleaning out the muck or powder after the process has been completed.

A further door 78 communicates with the chamber 19 for removing any other existing products which might move downwardly through the openings 18, the trap 14 being used for the entrapment and condensation of excess water or steam. The positioning of the outer openings 18 at a substantial distance from the walls of the vessel 10 insures that the maximum amount of steam will penetrate the muck instead of passing along the extreme outer edges thereof, which obviously would result in a waste of such steam. The temperature of the cooling water will usually be around 85 to 95 degrees Fahrenheit, although this may vary according to conditions, and it should be realized that the apparatus could be made in any desired size and could also be made of a different construction without departing from the essential spirit of the process described.

It will now be noted that the device of my invention provides the objects mentioned, with further advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. An apparatus for removing perchlorethylene from dense heavy muck containing a highly absorbent powder, fats, dirt and said perchlorethylene comprising a compact integrated assembly including a receiving vessel, a relatively heavy plate for supporting a mass of said heavy muck within the vessel, said plate being spaced upwardly from the bottom of said vessel to provide an expansion chamber therebeneath and having a multiplicity of perforations therethrough for directing the flow of steam uniformly through said mass to volatilize the perchlorethylene therefrom, the outermost perforations being spaced substantially inwardly from the periphery of said plate to prevent by-pass of steam up the inner walls of the vessel, a water vapor separator, means for supplying saturated steam at approximately 50 lbs. per square inch gauge pressure to the separator, means on the discharge side of said water separator for reducing the pressure of the steam discharged from said separator and supplying said steam at reduced pressure to said expansion chamber beneath said perforated plate whereby to deliver superheated steam through said plate to the mass of muck, means communicating with said vessel above the muck for condensing the effluent steam and perchlorethylene, and means for separating the perchlorethylene from the condensed steam.

2. The apparatus of claim 1 wherein agitating means is provided within said vessel above said perforated plate for stirring said muck.

3. The apparatus of claim 1 wherein said perforated plate is integrally sealed at its periphery to the inner wall of said vessel.

References Cited in the file of this patent

UNITED STATES PATENTS

| | | |
|---|---|---|
| 1,382,890 | Burrell et al. | June 28, 1921 |
| 1,420,613 | Voress et al. | June 20, 1922 |
| 1,862,945 | Schlotterhose | June 14, 1932 |
| 2,142,568 | Lowry | Jan. 3, 1939 |
| 2,181,672 | Sutcliffe et al. | Nov. 28, 1939 |
| 2,376,839 | Wansker | May 22, 1945 |
| 2,443,865 | Moffett | June 22, 1948 |
| 2,573,966 | Hamlin | Nov. 6, 1951 |